United States Patent
Katuwal et al.

(10) Patent No.: US 11,928,610 B2
(45) Date of Patent: Mar. 12, 2024

(54) CLINICAL CASE SEARCH AND GENERATION SYSTEM AND METHOD BASED ON A PROBABILISTIC ENCODER-GENERATOR FRAMEWORK

(71) Applicant: KONINKLIJKE PHILIPS N.V., Eindhoven (NL)

(72) Inventors: Gajendra Jung Katuwal, Somerville, MA (US); Bryan Conroy, Garden City South, NY (US); Jack He, Cambridge, MA (US); Jonathan Rubin, Cambridge, MA (US)

(73) Assignee: Koninklijke Philips N.V., Eindhoven (NL)

( * ) Notice: Subject to any disclaimer, the term of this patent is extended or adjusted under 35 U.S.C. 154(b) by 1026 days.

(21) Appl. No.: 16/679,842

(22) Filed: Nov. 11, 2019

(65) Prior Publication Data

US 2020/0160201 A1    May 21, 2020

Related U.S. Application Data

(60) Provisional application No. 62/769,300, filed on Nov. 19, 2018.

(51) Int. Cl.
| | |
|---|---|
| *G06F 17/16* | (2006.01) |
| *G06F 17/18* | (2006.01) |
| *G06N 3/045* | (2023.01) |
| *G06N 3/08* | (2023.01) |
| *G06N 7/01* | (2023.01) |
| *G06N 20/20* | (2019.01) |

(52) U.S. Cl.
CPC ............... *G06N 7/01* (2023.01); *G06F 17/16* (2013.01); *G06F 17/18* (2013.01); *G06N 3/045* (2023.01); *G06N 3/08* (2013.01); *G06N 20/20* (2019.01)

(58) Field of Classification Search
CPC ........ G06N 7/005; G06N 3/0454; G06N 3/08; G06N 20/20; G06F 17/16; G06F 17/18
See application file for complete search history.

(56) References Cited

U.S. PATENT DOCUMENTS

| | | |
|---|---|---|
| 2016/0155136 A1 | 6/2016 | Zhang et al. |
| 2017/0161635 A1 | 6/2017 | Oono et al. |
| (Continued) | | |

OTHER PUBLICATIONS

Tonnaer Active Learning in VAE Latent Space Technische Universiteit Einhdoven University of Technology, Aug. 2017 (Year: 2017).*

(Continued)

*Primary Examiner* — Rehana Perveen
*Assistant Examiner* — Cuong V Luu

(57) ABSTRACT

A method for training a probabilistic encoder-decoder having a latent space, the method including: extracting different types of medical data for a group of individuals; creating a data matrix X including the extracted medical data, wherein each row of the data matrix X includes data for one of the group of individuals; creating condition matrix C including features to define a clinical condition, wherein each row of the condition matrix C includes the condition data for one of the group of individuals; and training the encoder and the decoder to learn the latent space by minimizing the reconstruction loss and using a regularization effect to force clinically similar inputs to be close together in the latent space.

18 Claims, 1 Drawing Sheet

(56) References Cited

U.S. PATENT DOCUMENTS

2021/0074036 A1* 3/2021 Fuchs .................. G06N 3/0454
2022/0121884 A1* 4/2022 Zadeh .................... G06N 3/006

OTHER PUBLICATIONS

Bettencourt et al. Variational Inference for Bayesian Neural Networks University of Toronto, Oct. 6, 2017 (Year: 2017).*
Zhao et al. Adversarily Regularized Autoencoders Proceedings of the 35th International Conference on Machine Learning, 2018 (Year: 2018).*
Hernandez et al. Variational Encoding of Complex Dynamics APS Physics, Jun. 2018 (Year: 2018).*
Engel et al. Latent Constraints: Learning to Generate Conditionally From Unconditional Generative Models (Year: 2017).*
Tolstikhin et al. Wasserstein Auto-Decoders, Machine Learning sat.ML Mar. 12, 2018 (Year: 2018).*
Wikipedia_ConditionalProbabilityDistribution (Year: 2013).*
Miotto, R. et al., "Deep Patient: An Unsupervised Representation to Predict the Future of Patients from the Electronic Health Records". Scientific Reports 6, Article No. 26094 (2016).
Shen, X. et al., "Improving Variational Encoder-Decoders in Dialogue Generation". Computation and Language (cs.CL); Artificial Intelligence (cs.AI); Machine Learning (cs.LG). arXiv:1802.02032 [cs.CL . 2018.

* cited by examiner

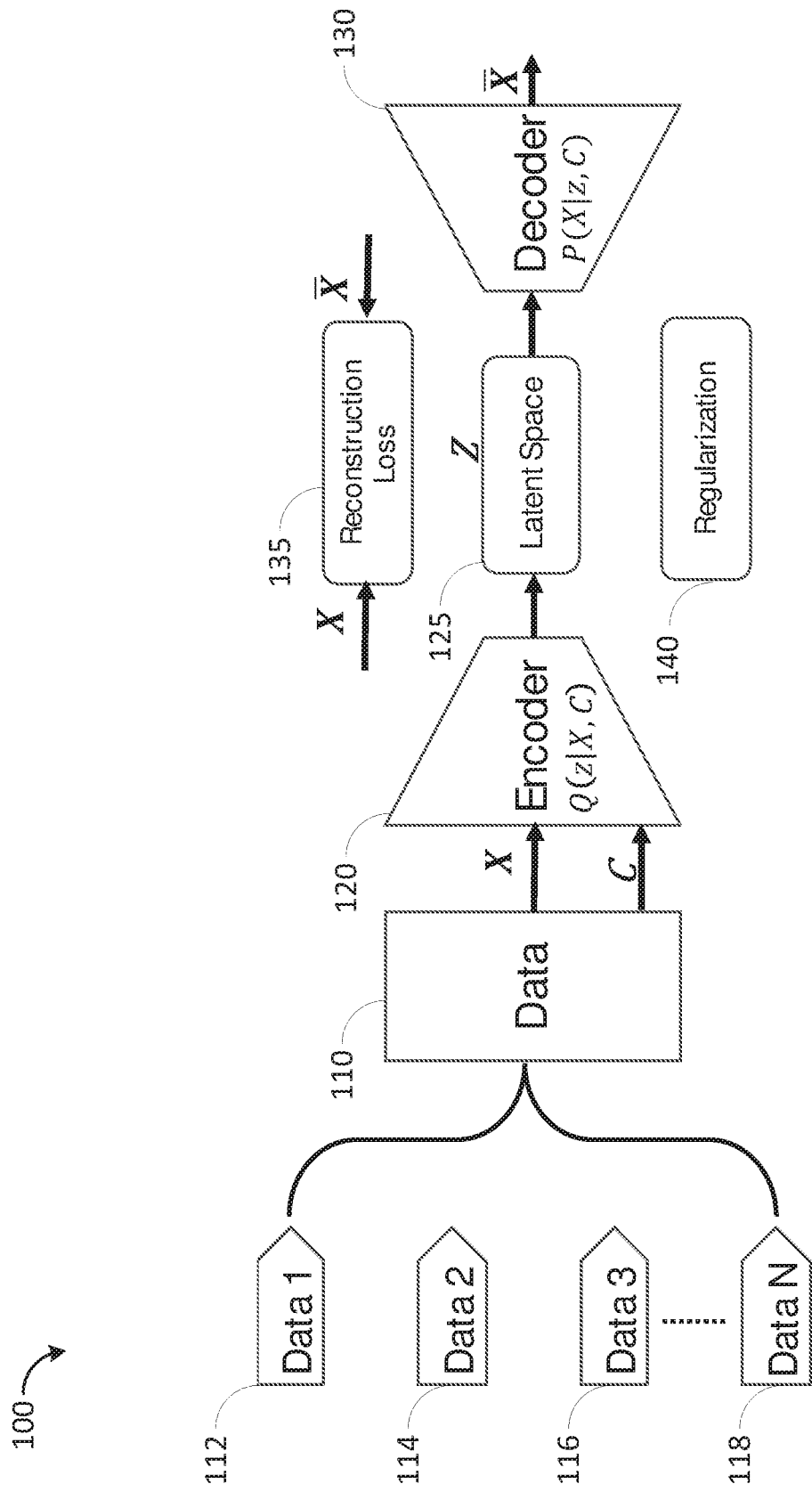

US 11,928,610 B2

CLINICAL CASE SEARCH AND GENERATION SYSTEM AND METHOD BASED ON A PROBABILISTIC ENCODER-GENERATOR FRAMEWORK

TECHNICAL FIELD

Various exemplary embodiments disclosed herein relate generally to a clinical case search and generation system and method based on a probabilistic encoder-generator framework.

BACKGROUND

The similarity between two data points in medical cases is generally quantified by calculating an appropriate distance metric between the numeric feature vectors representing the data points including transforming the features using different kernels before calculating the distance is common. However, the rationale behind the choice of relative importance of the features as well as the choice of kernels and distance metrics is subjective and is difficult to decide on. The problem becomes worse when the data comes from heterogeneous sources such as imaging, clinical text based reports, genomics data, electronic medical records (EMR), etc., because the same set of feature importance, kernels, and distance metrics might not necessarily be optimum for these heterogeneous data sources depending upon the nature of the data and their dimensionality.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for training a probabilistic encoder-decoder having a latent space, the method including: extracting different types of medical data for a group of individuals; creating a data matrix X including the extracted medical data, wherein each row of the data matrix X includes data for one of the group of individuals; creating condition matrix C including features to define a clinical condition, wherein each row of the condition matrix C includes the condition data for one of the group of individuals; and training the encoder and the decoder to learn the latent space by minimizing the reconstruction loss and using a regularization effect to force clinically similar inputs to be close together in the latent space.

Various embodiments are described, wherein the encoder function is modeled using a multivariate Gaussian distribution of the conditional mean and condition variance of the latent space variables.

Various embodiments are described, wherein using a regularization effect to force clinically similar inputs to be close together in a latent space further includes minimizing the Kullback-Leibler divergence between the encoder function modeled using a multivariate Gaussian distribution and the conditional mean and condition variance of the latent space variables.

Various embodiments are described, wherein training the encoder and the decoder to learn the latent space further includes using a stochastic gradient variational Bayes technique.

Various embodiments are described, wherein the different types of medical data include at least two of imaging data, clinical test data, genomics data, text formatted data, and electronic medical records data.

Various embodiments are described, wherein the probabilistic encoder and the probabilistic decoder are implemented using neural networks.

Further various embodiments relate to a method for finding clinically similar cases using a probabilistic encoder-decoder having a latent space, the method including: inputting data x0, x1, . . . xn for a plurality of cases and a condition c into the probabilistic encoder to produce a corresponding plurality of samples z0, z1, . . . zn in a latent space; finding the m closest samples in plurality of samples z1, . . . zn to the z0; and producing the corresponding input data samples corresponding to the m closest samples in plurality of samples z1, . . . zn as the m closest input samples to the input x0, wherein the probabilistic encoder-decoder having a latent space, is trained to produce the latent space by minimizing the reconstruction loss and using a regularization effect to force clinically similar inputs to be close together in the latent space.

Further various embodiments relate to a method for generating clinically similar synthetic cases to an existing case using a probabilistic encoder-decoder having a latent space, the method including: inputting data x0, x1, . . . xn for a plurality of cases and a condition c into the probabilistic encoder to produce a corresponding plurality of samples z0, z1, . . . zn in a latent space; generating m random samples around the sample z0; and inputting the m samples around the sample z0 into the probabilistic encoder to produce m synthetic cases, wherein the probabilistic encoder-decoder having a latent space, is trained to produce the latent space by minimizing the reconstruction loss and using a regularization effect to force clinically similar inputs to be close together in the latent space.

Various embodiments are described, wherein the randomly generated samples are within a predetermined Euclidian distance of the sample z0.

Further various embodiments relate to a non-transitory machine-readable storage medium encoded with instructions for training a probabilistic encoder-decoder having a latent space, including: instructions for extracting different types of medical data for a group of individuals; instructions for creating a data matrix X including the extracted medical data, wherein each row of the data matrix X includes data for one of the group of individuals; instructions for creating condition matrix C including features to define a clinical condition, wherein each row of the condition matrix C includes the condition data for one of the group of individuals; and instructions for training the encoder and the decoder to learn the latent space by minimizing the reconstruction loss and using a regularization effect to force clinically similar inputs to be close together in the latent space.

Various embodiments are described, wherein the encoder function is modeled using a multivariate Gaussian distribution of the conditional mean and condition variance of the latent space variables.

Various embodiments are described, wherein using a regularization effect to force clinically similar inputs to be close together in a latent space further includes instructions for minimizing the Kullback-Leibler divergence between the encoder function modeled using a multivariate Gaussian distribution and the conditional mean and condition variance of the latent space variables.

Various embodiments are described, wherein instructions for training the encoder and the decoder to learn the latent space further includes instructions for using a stochastic gradient variational Bayes technique.

Various embodiments are described, wherein the different types of medical data include at least two of imaging data, clinical test data, genomics data, text formatted data, and electronic medical records data.

Various embodiments are described, wherein the probabilistic encoder and the probabilistic decoder are implemented using neural networks.

Further various embodiments relate to a non-transitory machine-readable storage medium encoded with instructions for finding clinically similar cases using a probabilistic encoder-decoder having a latent space, including: instructions for inputting data x0, x1, . . . xn for a plurality of cases and a condition c into the probabilistic encoder to produce a corresponding plurality of samples z0, z1, . . . zn in a latent space; instructions for finding the m closest samples in plurality of samples z1, . . . zn to the z0; and instructions for producing the corresponding input data samples corresponding to the m closest samples in plurality of samples z1, . . . zn as the m closest input samples to the input x0, wherein the probabilistic encoder-decoder having a latent space, is trained to produce the latent space by minimizing the reconstruction loss and using a regularization effect to force clinically similar inputs to be close together in the latent space.

Further various embodiments relate to a non-transitory machine-readable storage medium encoded with instructions for generating clinically similar synthetic cases to an existing case using a probabilistic encoder-decoder having a latent space, including: instructions for inputting data x0, x1, . . . xn for a plurality of cases and a condition c into the probabilistic encoder to produce a corresponding plurality of samples z0, z1, . . . zn in a latent space; instructions for generating m random samples around the sample z0; and instructions for inputting the m samples around the sample z0 into the probabilistic encoder to produce m synthetic cases, wherein the probabilistic encoder-decoder having a latent space, is trained to produce the latent space by minimizing the reconstruction loss and using a regularization effect to force clinically similar inputs to be close together in the latent space.

Various embodiments are described, wherein the randomly generated samples are within a predetermined Euclidian distance of the sample z0.

BRIEF DESCRIPTION OF THE DRAWINGS

In order to better understand various exemplary embodiments, reference is made to the accompanying drawings, wherein:

FIG. 1 illustrates diagram of an embodiment of a probabilistic encoder-decoder.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A tool to quantify the similarity of two medical cases conditioned on a clinical context is highly desirable. Such a tool may be rapidly utilized to search for medical cases clinically similar to the patient of interest. The collective knowledge gathered from the similar cases may be critical to make better medical decisions for the patient of interest. Such a tool may be valuable in two cases: 1) when the medical data for a patient of interest is not enough to make an informed decision such as for patients with rare medical cases; and 2) when the time required for detailed decision making is not enough such as in an emergency setting.

Moreover, such a tool may be utilized to generate a synthetic cohort that is clinically similar to a patient or group of patients. One straightforward use may be to increase the sample size of a study by generating clinically similar cases to an existing database, thereby increasing the statistical power of the study.

The similarity between two data points in medical cases is generally quantified by calculating an appropriate distance metric between the numeric feature vectors representing the data points including transforming the features using different kernels before calculating the distance is common. However, the rationale behind the choice of relative importance of the features as well as the choice of kernels and distance metrics is subjective and is difficult to decide on. The problem becomes worse when the data comes from heterogeneous sources such as imaging, clinical text based reports, genomics data, EMR, etc., because the same set of feature importance, kernels, and distance metrics might not necessarily be optimum for these heterogeneous data sources depending upon the nature of the data and their dimensionality.

Embodiments of a data-driven approach to quantify the patient similarity will now be described. In particular, a probabilistic encoder-generator framework will be described that will learn a latent space where the similar cases under a given clinical context would be clustered together. The latent space will be dependent on the clinical context which may be changed during training to produce models for those different clinical contexts.

The embodiments described herein take a data-driven approach to quantify the patient similarity under a given clinical context. A probabilistic encoder-generator framework will encode the information from multiple heterogeneous data sources in such a way that the similar cases for a given clinical context will be clustered together. The framework may be flexibly utilized to find existing similar patients or generate similar synthetic cases within a clinical context.

FIG. 1 illustrates diagram of an embodiment of a probabilistic encoder-decoder. The probabilistic encoder-decoder 100 includes a deep conditional generative model with Gaussian latent variables, and the probabilistic encoder-decoder 100 is generally referred to as conditional variational Autoencoder (CVAE). The encoder 120 and the decoder 130 of the model are modeled by neural networks. The models are trained in end-to-end fashion using stochastic gradient variational Bayes technique, and the prediction is done using stochastic feed-forward inference. The probabilistic encoder-decoder 100 may handle heterogeneous data sources as will now be described.

In FIG. 1, the input data may include DATA 1 112, DATA 2, 114, DATA 3, 115, and DATA N 118. The input data may come from heterogeneous sources where for example, DATA 1 112 is imaging data, DATA 2 114 is text data, DATA 3 116 is genomics data, DATA N is EMR data, etc. First the input data 112, 114, 116, and 118 may be combined into a single data matrix $D_{n \times p}$ 110, where n is the number of samples and p is the dimensionality of a sample. One simple way to combine different data sources would be to concatenate the numeric vectors into a single numeric vector for each sample, for example:

$$D_{n \times p} = [D1_{n \times p1}, D2_{n \times p2}, \ldots, DK_{n \times p3}]$$

where, D1, D2, . . . , DK are different data sources with dimensionalities p1, p2, . . . , pK respectively.

Next, the data may be split into two matrices X and C. X contains the data samples. C is called condition matrix and contains features that define a clinical condition. For example, a clinical condition for a sample may be a set of data related to the conditions of interest such as [smoking_history, age>60, gender] and such a condition will be a row in the condition matrix. Various conditions and related features may be used as part of the condition matrix.

Training of the model will now be described. The desired objective is to learn a suitable latent representation P(z) from the data X, where z is a latent variable with dimensionality much smaller than that of X. To make the learned latent representation more likely under the data X and condition C, one may first try to learn P(z|X, C) and then infer P(z) from it. However, P(z|X, C) requires exponential time to compute as it needs to be evaluated over all configurations of latent variable z. So, instead P(z|X, C) by may be approximated by another probability distribution Q(z|X, C) using variational inference. P(z|X, C) is modeled with a multivariate Gaussian distribution $N(\mu(X), \Sigma(X))$ where $\mu[X], \Sigma[X]$ are the conditional mean and variance of Z and are dependent on X. The latent representations are sampled from the latent space according to the use case and the clinical samples are reconstructed/generated by the decoder P(X|Z, C). Here, the encoder 120 and the decoder 130 are functionally approximated by neural networks. The whole encoder-decoder framework may be trained using stochastic gradient descent.

During optimization, Q(z|X, C) if forced to be similar to $N(\mu, \sigma^2)$ by minimizing the Kullback-Leibler divergence between them. This minimization introduces a regularization effect that forces latent representations of clinically similar inputs (under condition C) to be close together 140. Due to this design of the latent space where the neighboring points are clinically similar to each other, the generated samples $x_1, x_2$ from two close latent points $z_1, z_2$ tend to be clinically similar. In addition, reconstruction loss, for example, a cross-entropy between the input samples and reconstructed sample, is minimized to learn the latent space faithful to the given data 135. The reconstruction loss takes the difference between the original input X to the probabilistic encoder-decoder 100 and the reconstructed input $\bar{X}$.

The resulting probabilistic encoder-decoder 100 may be utilized as a search engine to find similar clinical cases in a database or as a generation engine to generate similar synthetic clinical cases.

The use of the probabilistic encoder-decoder 100 as a search engine will first be described. Given a clinical case $x_0$ and a clinical context c, find m existing cases in the database which are similar to $x_0$ under the condition c. That is, find $$\left\{ \begin{array}{c} z_1 \\ z_2 \\ \vdots \\ z_m \end{array} \right\}$$

close to $z_0$ such that $$\left\{ \begin{array}{c} x_1 \\ x_2 \\ \vdots \\ x_m \end{array} \right\} \subseteq X$$

under c. This may be accomplished by carrying out the following steps.

First, train the probabilistic encoder-decoder 100 using data X and condition matrix C Second, using the encoder, compute latent representations of all the data samples and store them as a database $D_z$. Alternatively, only the parameters of the conditional distribution Q(z|X, C) may be stored (e.g., the mean and variance in the discussion above) to save the storage space and calculate the latent representations on the fly for the following operations. There is a storage-speed tradeoff between these two options. The operations below are based on the first option where $$D_z = \left\{ \begin{array}{c} z_1 \\ z_2 \\ \vdots \\ z_m \end{array} \right\},$$

where $z_k$ is the latent representation of $x_k$.

Third, given a clinical case $x_0$ and clinical context c perform the following steps. Using the encoder 120, compute the latent representation $z_0$ of $x_0$ and clinical context c. Next, find m nearest latent samples to $z_0$ in the latent database $D_z$ that maximize the $P(z|x_0, c)$ values. In practice, $P(z|x_0, c)$ is replaced by the approximating distribution $Q(z|x_0, c)$ which enables simpler nearest neighbor calculation using Euclidean distance because $Q(z|x_0, c)$ is an anisotropic Gaussian. Then, select the m data samples in the data space X corresponding to the m nearest latent samples as the most clinically similar cases to $x_0$ under clinical condition c.

The probabilistic encoder-decoder 100 may also be used as a generation engine where given a clinical case $x_0$ and clinical context c, synthetic cases are generated which are similar to $x_0$ under the condition c; that is find $$\left\{ \begin{array}{c} z_1 \\ z_2 \\ \vdots \\ z_m \end{array} \right\}$$

such that $$\left\{\begin{array}{c} x_1 \\ x_2 \\ \vdots \\ x_m \end{array}\right\} \cap X \equiv \emptyset$$

under c.

This may be accomplished by carrying out the following steps. First, train the encoder-decoder framework using data X and condition matrix C. Second, given a clinical case $x_0$ and clinical context c perform the following steps. Using the encoder, compute the latent representation $z_0$ of $x_0$. Next, sample m latent samples around $z_0$ in the latent space. This may be done by randomly generating latent samples within a desired distance in the latent space. Finally, using the decoder, generate (reconstruct) m synthetic clinical cases from the m latent samples. These synthetic cases are clinically similar to $x_0$ under clinical condition c The probabilistic encoder-decoder 100 described herein may be used to solve the following technological problems. The probabilistic encoder-decoder 100 bypasses the complex step of assigning different feature importance, choosing appropriate kernels and distance metrics when trying to identify medically similar cases. Further, the probabilistic encoder-decoder 100 provides a simple and unified framework for similarity quantification using heterogenous data. Also, the probabilistic encoder-decoder 100 provides a flexible way to change the definition of the clinical similarity via the change in clinical context during training. The probabilistic encoder-decoder 100 provides a simple way to generate clinically similar synthetic samples.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and FIGURES are for illustrative purposes only and do not in any way limit the invention, which is defined only by the claims.

What is claimed is:

1. A method for training a probabilistic encoder-decoder having a latent space, the method comprising:
    extracting different types of medical data for a group of individuals;
    creating a data matrix X including the extracted medical data, wherein each row of the data matrix X comprises data for one of the group of individuals;
    creating condition matrix C comprising features to define a clinical condition, wherein each row of the condition matrix C comprises the condition data for one of the group of individuals; and
    training the encoder and the decoder to learn the latent space by minimizing a reconstruction loss and using a regularization effect to force clinically similar inputs to be close together in the latent space by minimizing a Kullback-Leibler divergence between the clinically similar inputs.

2. The method of claim 1, wherein the encoder function is modeled using a multivariate Gaussian distribution of the conditional mean and condition variance latent space variables.

3. The method of claim 2, wherein the minimizing of the Kullback-Leibler divergence between the encoder function modeled comprises using the multivariate Gaussian distribution and the conditional mean and condition variance of the latent space variables.

4. The method of claim 1, wherein training the encoder and the decoder to learn the latent space further includes using a stochastic gradient variational Bayes technique.

5. The method of claim 1, wherein the different types of medical data include at least two of imaging data, clinical test data, genomics data, text formatted data, and electronic medical records data.

6. The method of claim 1, wherein the probabilistic encoder and the probabilistic decoder are implemented using neural networks.

7. A method for generating clinically similar synthetic cases to an existing case using a probabilistic encoder-decoder having a latent space, the method comprising:
    inputting data $x_0, x_1, \ldots x_n$ for a plurality of cases and a condition c into the probabilistic encoder to produce a corresponding plurality of samples $z_0, z_1, \ldots z_n$ in a latent space;
    generating m random samples around the sample $z_0$; and
    inputting the m samples around the sample $z_0$ into the probabilistic encoder to produce m synthetic cases,
    wherein the probabilistic encoder-decoder having a latent space, is trained to produce the latent space by minimizing the reconstruction loss and using a regularization effect to force clinically similar inputs to be close together in the latent space by minimizing a Kullback-Leibler divergence between the clinically similar inputs.

8. The method of claim 7, wherein the randomly generated samples are within a predetermined Euclidian distance of the sample $z_0$.

9. The method of claim 7, wherein an encoder function is modeled using a multivariate Gaussian distribution of a conditional mean and condition variance of latent space variables.

10. The method of claim 9, wherein the minimizing the Kullback-Leibler divergence between the encoder function modeled comprises using the multivariate Gaussian distribution and the conditional mean and condition variance of the latent space variables.

11. The method of claim 7, wherein training the encoder and the decoder to learn the latent space further comprises using a stochastic gradient variational Bayes technique.

12. The method of claim 7, wherein different types of medical data include at least two of imaging data, clinical test data, genomics data, text formatted data, and electronic medical records data.

13. A non-transitory machine-readable storage medium encoded with instructions for training a probabilistic encoder-decoder having a latent space, comprising:
 instructions for extracting different types of medical data for a group of individuals;
 instructions for creating a data matrix X comprising the extracted medical data, wherein each row of the data matrix X comprises data for one of the group of individuals;
 instructions for creating condition matrix C comprising features to define a clinical condition, wherein each row of the condition matrix C comprises condition data for one of the group of individuals; and
 instructions for training the encoder and the decoder to learn the latent space by minimizing a reconstruction loss and using a regularization effect to force clinically similar inputs to be close together in the latent space by minimizing a Kullback-Leibler divergence between the clinically similar inputs.

14. The non-transitory machine-readable storage medium of claim 13, wherein an encoder function is modeled using a multivariate Gaussian distribution of a conditional mean and condition variance of latent space variables.

15. The non-transitory machine-readable storage medium of claim 14, wherein the instructions for minimizing the Kullback-Leibler divergence between the encoder function modeled comprise instructions to use the multivariate Gaussian distribution and the conditional mean and condition variance of the latent space variables.

16. The non-transitory machine-readable storage medium of claim 13, wherein instructions for training the encoder and the decoder to learn the latent space further comprises instructions for using a stochastic gradient variational Bayes technique.

17. The non-transitory machine-readable storage medium of claim 13, wherein the different types of medical data include at least two of imaging data, clinical test data, genomics data, text formatted data, and electronic medical records data.

18. The non-transitory machine-readable storage medium of claim 13, wherein the probabilistic encoder and the probabilistic decoder are implemented using neural networks.

* * * * *